Aug. 29, 1967   R. H. TAYLOR   3,338,128
WEDGE-TYPE EYE BOLT
Filed Aug. 30, 1965
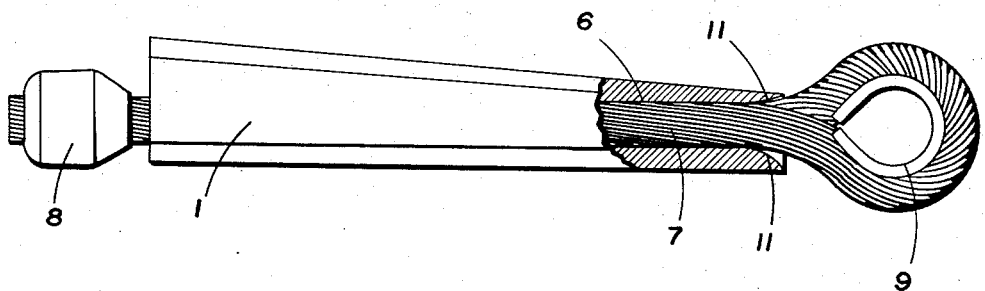
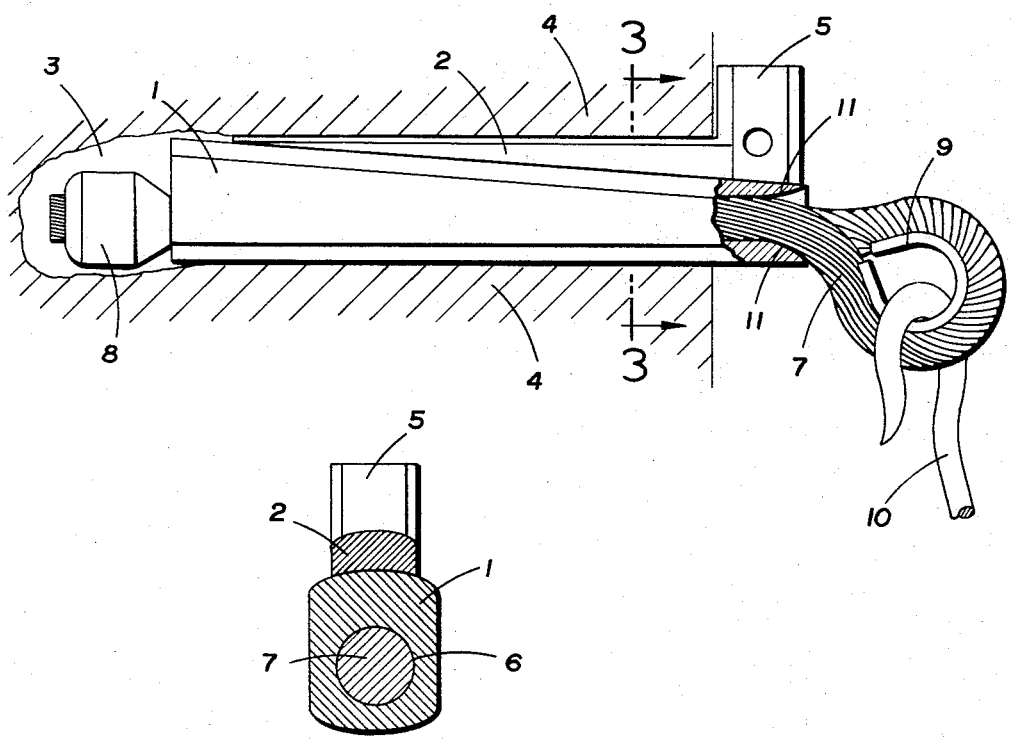
INVENTOR.
Raymond H. Taylor
BY
Webster & Webster
ATTORNEYS United States Patent Office 3,338,128
Patented Aug. 29, 1967

3,338,128
WEDGE-TYPE EYE BOLT
Raymond H. Taylor, P.O. Box 641,
Bishop, Calif. 93514
Filed Aug. 30, 1965, Ser. No. 483,656
3 Claims. (Cl. 85—79)

ABSTRACT OF THE DISCLOSURE

An eye bolt having a rigid shank designed to be wedge-secured in a hole drilled in a rock wall of a mine or the like; the eye being flexibly mounted on the shank outwardly of the wall and providing the anchor or dead-end point for a hauling cable, a block and tackle unit, or similar equipment.

This invention relates in general to an improved wedge-type eye bolt and which is designed to be secured in a hole drilled in a rock wall of a mine or the like; the eye being disposed outwardly of the wall and providing the anchor or dead-end point for a hauling cable, a block and tackle unit, or similar equipment.

As ordinarily constructed, the eye is rigid with the shank of the bolt and, being incapable of relative bending or swivel movement, the eye—when subject to a forceful angular pull—tends to break or snap off the shank.

It is, therefore, the major object of this invention to provide a wedge-type eye bolt wherein the eye and the shank are initially separate parts, and are connected in a novel manner which permits the eye to deflect in any direction under heavy load and relative to the shank without damage to the eye or its separation—by fracturing—from such shank.

Another important object of the invention is to provide a wedge-type eye bolt, as above, which comprises a rigid shank having a longitudinal bore extending completely therethrough and which bore receives a slightly longer length of flexible cable on the outer end of which the eye is formed; an enlarged stop being fixed on the inner end of the cable adjacent the rear end of the shank whereby to prevent longitudinal escape of the cable from the shank. With this arrangement the eye is disposed outwardly of the front end of the shank and clear of the same so that the eye—by reason of the flexibility of the adjacent part of the cable—may freely swivel or be angled relative to the shank.

A further object of the invention is to provide a wedge-type eye bolt which is designed for ease and economy of manufacture, and convenience of installation and use.

A still further object of the invention is to provide a practical, reliable, and durable wedge-type eye bolt and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the improved eye bolt, but without the holding wedge; the shank of the bolt being partly broken out and in section.

FIG. 2 is a similar view, but shows the bolt as wedge-secured in a hole drilled in a rock wall or the like.

FIG. 3 is a transverse section taken on line 3—3 of FIG. 2.

Referring now more particularly to the drawings and to the characters of reference marked thereon, the improved eye bolt includes a rigid, elongated shank 1 which is of taper form from end to end. This shank is adapted for engagement by a holding wedge 2 when the shank is inserted into a hole 3 drilled in a rock wall 4; the wedge having an enlarged driving head 5 on its outer end, and when driven said wedge holding the shank 1 positively in place in the hole 3. As shown in FIG. 3, the outer surface of the wedge 2 is transversely convexly curved to substantially fit the wall of the hole 3, while the inner surface of the wedge is transversely concavely curved to fit the related transversely rounded longitudinal face of the shank 1. These matching surfaces assure of a positive holding action of the wedge when driven into place.

The assembly of shank 1 and holding wedge 2 is substantially conventional; the present invention comprising the following:

The shank 1 is straight-drilled from end to end with a bore 6 for the snug but turnable reception of a length of heavy duty but flexible, steel cable 7. Such cable (which is slightly longer than shank 1) projects a short distance beyond the rear end of said shank; the projecting or inner end portion of the cable being fitted with a cylindrical button or stop 8 which is fixedly secured thereon as by press fitting. The stop 8 is of less diameter than the rear end of shank 1 and is adapted to engage said end of the shank to prevent appreciable forward movement of the cable therein.

The cable 7 also projects a slight distance beyond the front or small end of the shank 1, and at such projecting end the cable is formed with an eye 9 for detachable engagement by a conventional form of hook 10 such as is used in connection with a block and tackle unit or similar pulling equipment.

As the eye 9 is disposed outwardly of the front end of the shank 1 and will be laterally deflected from the axial plane of the cable 7 by the forceful pull from hook 10, the adjacent portion of said cable will be correspondingly swiveled or angled. However, as the cable is flexible, there is no tendency for the eye 9 to break off under the force of the pull imposed on said eye.

The front end portion of the bore 6 is roundedly flared as shown at 11; the purpose of this feature being to assure that when the adjacent part of the cable bends laterally it will not be engaged and damaged by any sharp edge.

Also, as the front end of the shank normally projects a distance outwardly from the wall 4 as shown in FIG. 2, said wall is not engaged by the eye 9 nor hook 10 when the latter subjects the eye to a lateral pull, and said eye consequently deflects to an angular position.

Further, as the cable is turnable in the bore 6, the eye 9 can be readily set in the desired rotative position for proper engagement by hook 10.

From the foregoing description, it will be readily seen that there has been produced such a wedge-type eye bolt as substantially fulfills the objects of the invention, as set forth herein.

While this specification sets forth in detail the present and preferred construction of the wedge-type eye bolt, still in practice such deviations from such detail may be resorted to as do not form a departure from the spirit of the invention, as defined by the appended claims.

Having thus described the invention, the following is claimed as new and useful and upon which Letters Patent is desired:

1. An eye bolt comprising a shank adapted to be mounted in a fixed position, the shank having a longitudinal bore therethrough from end to end, a length of flexible cable in the bore and projecting from both ends of the shank, connection means on one end of the cable, an enlarged stop on the other end of the cable and engageable with the adjacent end of the shank, and a driven type wedge member adapted to anchor said shank in a hole.

2. An eye bolt, as in claim 1, in which the cross sectional size of the stop is less than that of the adjacent end of the shank.

3. An eye bolt comprising an elongated shank adapted to project into a hole drilled in a wall to initially relatively loosely receive the shank, one side of the shank sloping toward its outer end relative to its opposite side and to the adjacent face of the hole when said opposite side of the shank rests on the corresponding face of the hole, a removable wedge adapted to be driven into the hole in engagement between sail sloping side of the shank and the adjacent face of the hole, the shank having a longitudinal bore therethrough, a length of flexible cable in the bore and projecting from both ends of the shank, an eye on the cable at the outer end of the shank, and an enlarged stop on the other end of the cable engageable with the adjacent end of the shank; the cross sectional size of the stop being less than that of the adjacent end of the shank.

References Cited

UNITED STATES PATENTS

| 1,029,859 | 6/1912 | Flack | 52—704 XR |
| 1,950,317 | 3/1934 | Luneburg | 287—80 XR |
| 2,147,706 | 2/1939 | Kerr | 287—83 |
| 2,349,075 | 5/1944 | Cole | 85—72 |
| 3,110,908 | 11/1963 | Newgard | 52—711 XR |
| 3,124,385 | 3/1964 | Neptune | 52—704 XR |

FOREIGN PATENTS 74,607   9/1918   Austria.

BERNARD A. GELAK, *Primary Examiner.*